United States Patent
Dargue et al.

(10) Patent No.: US 8,170,976 B2
(45) Date of Patent: May 1, 2012

(54) ASSESSING STUDENT PERFORMANCE AND PROVIDING INSTRUCTIONAL MENTORING

(75) Inventors: Brandt Wilson Dargue, Kirkwood, MO (US); Clifford B. Sowadski, Eureka, MO (US); Barbara Jo Barnett Buck, Saint Jacob, IL (US); James R. Pitz, Kirkwood, MO (US)

(73) Assignee: The Boeing Company, Chicago, IL (US)

( * ) Notice: Subject to any disclaimer, the term of this patent is extended or adjusted under 35 U.S.C. 154(b) by 828 days.

(21) Appl. No.: 12/253,375

(22) Filed: Oct. 17, 2008

(65) Prior Publication Data
US 2010/0100520 A1   Apr. 22, 2010

(51) Int. Cl.
*G06F 17/00* (2006.01)
*G06N 5/02* (2006.01)

(52) U.S. Cl. .......................................................... 706/47

(58) Field of Classification Search ..................... 706/47
See application file for complete search history.

(56) References Cited

U.S. PATENT DOCUMENTS

| 6,053,737 A | 4/2000 | Babbitt et al. |
| 7,467,121 B2 * | 12/2008 | Hagelin .......................... 706/47 |
| 2008/0145830 A1 | 6/2008 | Huang et al. |

* cited by examiner

*Primary Examiner* — Michael B Holmes
(74) *Attorney, Agent, or Firm* — Yee & Associates, P.C.

(57) ABSTRACT

A method, apparatus, and computer program product are present for performing a simulation. The simulation is executed. Simulation data is collected while executing the simulation to form collected simulation data. A number of events is generated by applying a first number of rules to the collected simulation data to form a number of generated events. A number of commands is generated as a reaction to the number of generated events by applying a second number of rules to the number of generated events to form a number of simulation commands. The number of simulation commands is sent to the simulation.

21 Claims, 9 Drawing Sheets

ASSESSING STUDENT PERFORMANCE AND PROVIDING INSTRUCTIONAL MENTORING

BACKGROUND INFORMATION

1. Field

The present disclosure relates generally to an improved data processing system and, in particular, to a method and apparatus for training students using a simulation. Still more particularly, the present disclosure provides a method and apparatus for training students in aircraft operations using a simulation.

2. Background

Aircraft training involves teaching students procedures regarding aircraft. These procedures may include, for example, maintenance procedures, flying, and other suitable procedures. With aircraft training, a training course may be employed to teach students operations with respect to various types of aircraft. The training courses include theoretical or classroom learning performed on the ground.

Additionally, students may perform operations using a simulation. The simulation may be, for example, a flight simulator or a maintenance simulator. A simulator is software and/or hardware used to simulate various situations. A simulator may simulate a cockpit or flight deck of an aircraft. Further, a simulator may also simulate tools and/or procedures used by maintenance personnel.

When simulations are performed, an instructor may provide feedback. In some simulations, an instructor may take the form of a role player. For example, with combat simulations, a student may operate one simulator to fly to a target or a goal. The instructor may play an enemy pilot in another simulator.

With simulations, another instructor may monitor the actions being performed by the student in the simulator. In some types of training, the simulator may include a synthetic role player. Artificial intelligence or other types of processes may be used. After performing simulations using a simulator, a student may then perform practical exercises on or in an aircraft.

With the use of instructors, the ratio of students per instructor may result in bottlenecks in training pilots and/or maintenance personnel. An instructor may be capable of only working with some set number of students in an efficient manner. Automated performance and assessment systems may be limited in the skills and feedback that may be provided using currently available simulators.

Therefore, it would be advantageous to have an improved method and apparatus to train students using simulations that overcome the problems discussed above.

SUMMARY

In one advantageous embodiment, a method is present for performing a simulation. The simulation is executed. Simulation data is collected while executing the simulation to form collected simulation data. A number of events is generated by applying a first number of rules to the collected simulation data to form a number of generated events. A number of commands is generated as a reaction to the number of generated events by applying a second number of rules to the number of generated events to form a number of simulation commands. The number of simulation commands is sent to the simulation.

In another advantageous embodiment, an apparatus comprises a data collector system, an assessment system, an instructor system, and a number of data processing systems. The data collector system is capable of receiving simulation data from a number of simulations and capable of sending a number of commands to the number of simulations. The assessment system is capable of generating a number of events from the simulation data. The instructor system is capable of generating a reaction to the number of events. The data collection system, the assessment system, and the instructor system are capable of being executed on the number of data processing systems.

In yet another advantageous embodiment, a computer program product comprises a computer recordable storage medium and program code, stored on the computer recordable storage medium. Program code is present for executing the simulation, as well as collecting simulation data while executing the simulation to form collected simulation data. Program code is also present for generating a number of events by applying a first number of rules to the collected simulation data to form a number of generated events. In addition, program code is present for generating a number of commands as a reaction to the number of generated events by applying a second number of rules to the number of generated events to form a number of simulation commands. Further, program code is present for sending the number of simulation commands to the simulation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
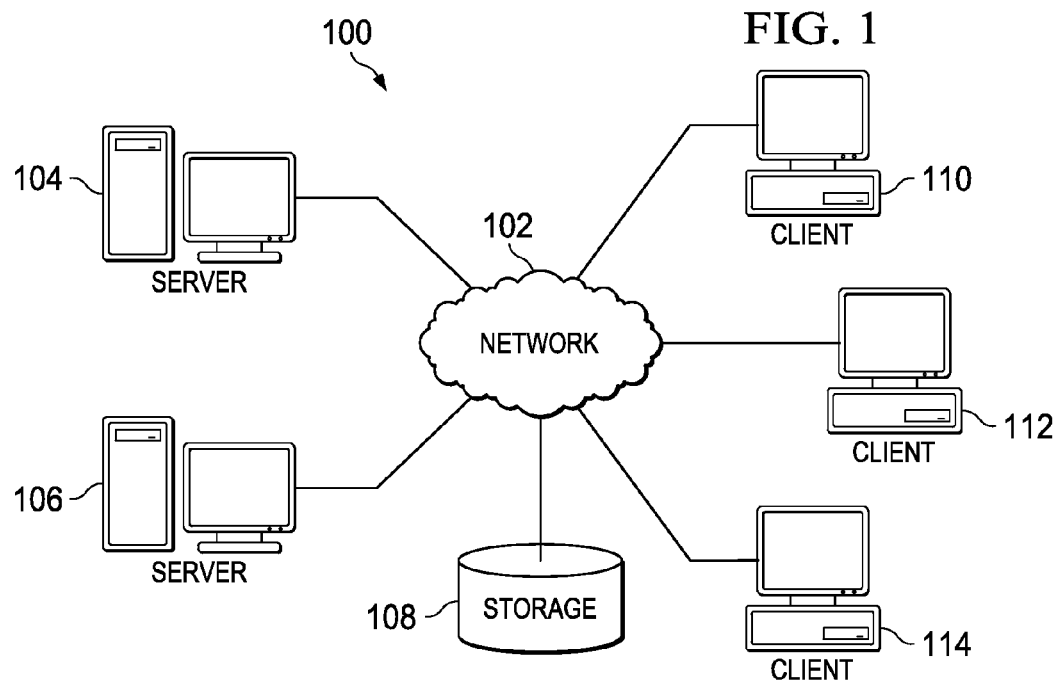
FIG. 1 is a pictorial representation of a network of data processing systems in which illustrative embodiments may be implemented.
Figure 2:
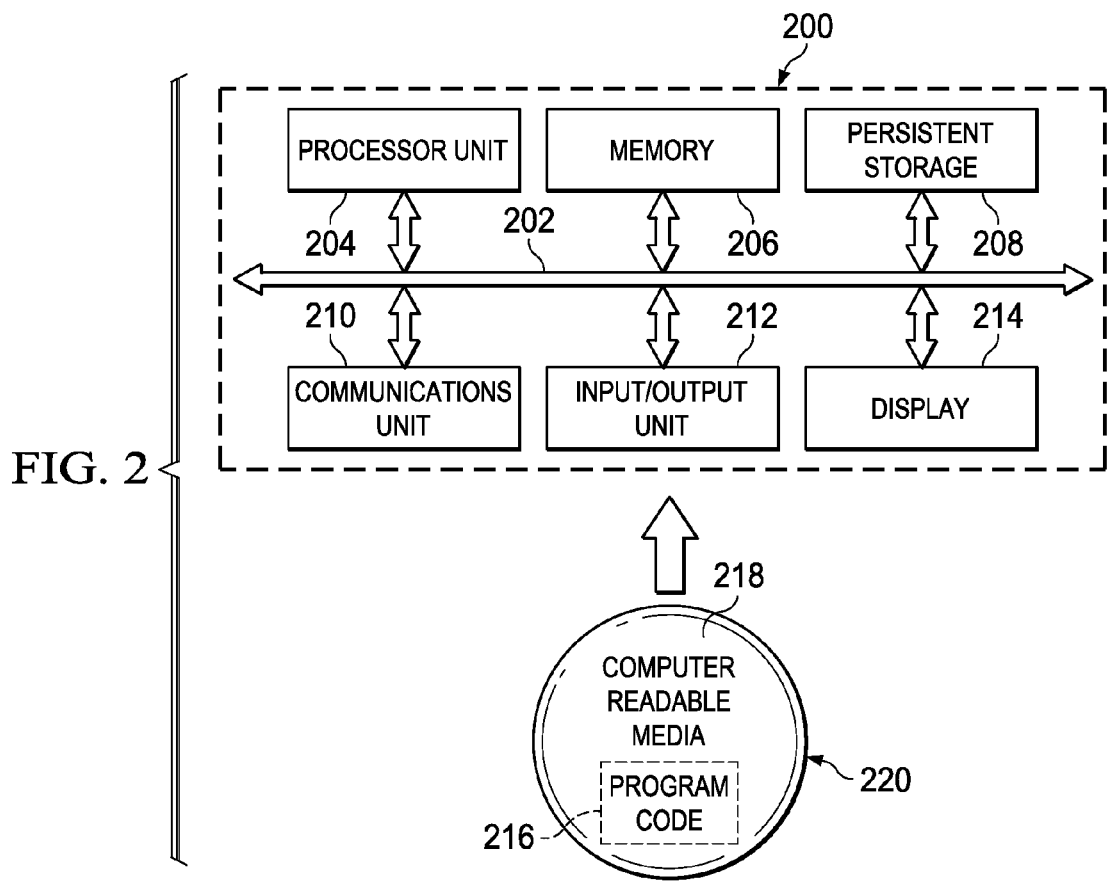
FIG. 2 is a block diagram of a data processing system in which illustrative embodiments may be implemented.

With reference now to the figures and, in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers, network computers, or simulators. In the depicted example, server 104 provides data, such as boot files, operating system images, and applications to clients 110, 112, and 114. Clients 110, 112, and 114 are clients to server 104 in this example. In the illustrative examples, one or more components within network data processing system 100 may be used in a simulation environment to provide training for various users. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use by client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages.

Of course, network data processing system 100 also may be implemented as a number of different types of networks such as, for example, an intranet, a local area network (LAN), or a wide area network (WAN). FIG. 1 is intended as an example and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In these examples, data processing system 200 may be used as part of a simulator or execute processes for a simulation environment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis.

Memory 206, in these examples, may be, for example, a random access memory or any other suitable volatile or non-volatile storage device. Persistent storage 208 may take various forms depending on the particular implementation. For example, persistent storage 208 may contain one or more components or devices.

For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory, that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments also recognize that with currently used performance assessment and mentoring programs, bad training may occur that was not anticipated when the program was created. For example, a student pilot may fly too low for an enemy aircraft when it is desirable for the pilot to fly at an altitude and speed relative to the enemy aircraft. The student pilot may fly 1,000 feet below the enemy aircraft rather than 500 feet below the enemy aircraft. Current simulators that perform assessment and training may not take this type of goal into account and may not provide an assessment of this type of requirement.

In yet another example, the different advantageous embodiments recognize that in performing aircraft maintenance, a maintenance operator may replace an entire engine and a fuel filter without testing the components. The different advantageous embodiments recognize that this type of process may generate the appropriate end result, but it is not the correct approach. In some cases, maintenance operators may swap out components without testing the components. If the simulator does not take this into account, then the maintenance operator may learn bad procedures.

Bad training also may occur on the part of an instructor. For example, an instructor may not cover all of the different issues or goals for a particular training session. This may occur when the instructor does not remember particular points that have been covered in prior sessions.

In another example, the currently available simulation environments may not provide reliability in measuring student performance. For example, if an instructor rating students is sick one day, plays a role in a scenario on another day, or flies for a missing student, another instructor rating students may not provide the same type of rating.

Further, a student may obtain bad habits when performing in a solo-type situation. For example, a situation display may be error free in a simulation and used for close in maneuvering. In the real world, this type of display is inadequate for actual close in maneuvering. This type of habit may not be caught by a live instructor.

The different advantageous embodiments recognize that with current training courses, the number of students that may be trained may be limited based on the number of instructors. Further, the different advantageous embodiments also recognize that currently used automated performance assessment and instruction mentoring methodologies are complex and difficult to create and/or adapt.

The different advantageous embodiments recognize also that new tactics or guidelines may be generated. Currently available simulators are unable to take these changes into account without the rewriting of code and/or modification of code for the simulator. The different advantageous embodiments recognize that this type of re-design for simulators may make changing the simulators costly and/or time prohibitive.

Thus, the different advantageous embodiments provide a method and apparatus for training students. The different advantageous embodiments include a method for performing a simulation in which a simulation is executed. Simulation data is collected while executing the simulation to form collected simulation data. A number of events is generated by applying a first number of rules to the collected simulation data to form a number of generated events. A number of commands are generated as a reaction to the number of generated events using a second number of rules to form a number of simulation commands. The simulation commands are sent to the simulation.

Further, a number of rules in at least one of the first number of rules and the second number of rules may be changed prior to executing the simulation. The ability to change rules allows for flexibility in changing how events and/or reactions are generated. As used herein, the phrase "at least one of", when used with a list of items, means that different combinations of one or more of the items may be used, and only one of each item in the list may be needed. For example, "at least one of item A, item B, and item C" may include, without limitation, item A or item A and item B.

This example also may include item A, item B, and item C, or item B and item C. In other examples, "at least one of" may be, for example, without limitation, two of item A, one of item B, and ten of item C; four of item B and seven of item C; and other suitable combinations.

In some embodiments, sending simulation commands to the simulation may involve sending the commands to a live instructor in the form of a notification. This notification may be sent back to the simulator or to some other device. For example, the notification may be sent to an audio device in the form of a voice prompt or instruction.

Figure 3:
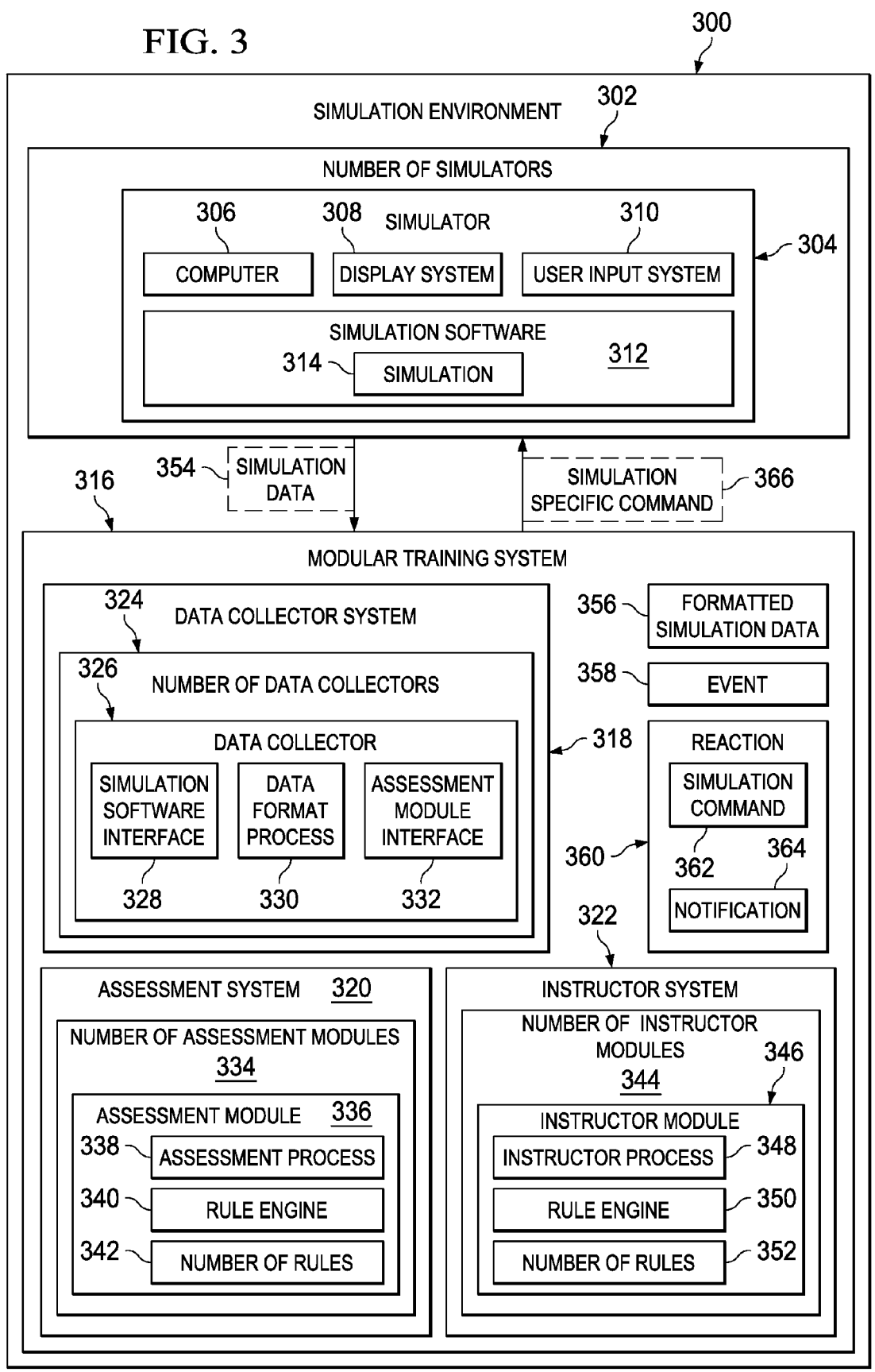
FIG. 3 is a diagram of a simulation environment in accordance with an advantageous embodiment.

With reference now to FIG. 3, a diagram of a simulation environment is depicted in accordance with an advantageous embodiment. In this example, simulation environment 300 is an example of an environment that may be used to train students. In particular, simulation environment 300 may be used to assess student performance as well as provide instructional mentoring to students.

Simulation environment 300 may be implemented using one or more data processing systems within network data processing system 100 in FIG. 1.

Simulation environment 300 includes number of simulators 302. A number, as used herein, refers to one or more items. For example, a number of simulators is one or more simulators. Number of simulators 302 is hardware and/or software that may be used to perform simulations in training users of number of simulators 302. In this example, simulator 304 is an example of one simulator within number of simulators 302. Simulator 304 includes computer 306, display system 308, user input system 310, and simulation software 312.

Computer 306 may be implemented using data processing system 200 in FIG. 2. Display system 308 may be a number of displays used to present the simulation to the user. These displays may include, for example, projection displays, liquid crystal display panels, and other suitable types of displays.

User input system 310 may be any number of devices used to receive user input. User input system 310 may, for example, simulate controls in a cockpit. User input system 310 may be as complex as providing switches, knobs, touch panels, joysticks, columns, and/or other suitable hardware devices that may be present in a cockpit. In other advantageous embodiments, user input system 310 may be less complex. For example, user input system 310 may comprise only a pointing device and a keyboard.

Simulation software 312 performs processes to execute simulation 314 within simulator 304. Simulation software 312 may take various forms. Simulation software 312 may include, but is not limited to, Microsoft ESP, X-Plane®, and simulations built by Boeing Training Systems and Services. Microsoft ESP is available from Microsoft Corporation. X-Plane® is available from Laminar Research. Simulations from Boeing Training Systems and Services are available from Boeing Corporation.

In these examples, simulation 314 may take various forms. In the different advantageous embodiments, simulation 314 is used to perform aircraft training. This simulation may be for flight training, maintenance training, or some other suitable type of aircraft operation.

The different advantageous embodiments provide modular training system 316 to aid training students using number of simulators 302. Modular training system 316 contains data collector system 318, assessment system 320, and instructor system 322.

Data collector system 318 contains number of data collectors 324. Data collector 326 is an example of a data collector within number of data collectors 324. Data collector 326 contains simulation software interface 328, data format process 330, and assessment module interface 332.

Assessment system 320 contains number of assessment modules 334. Assessment module 336 is an example of an assessment module within number of assessment modules 334. Assessment module 336 includes assessment process 338, rule engine 340, and number of rules 342. Instructor system 322 contains number of instructor modules 344. Instructor module 346 is an example of an instructor module within number of instructor modules 344. Instructor module 346 includes instructor process 348, rule engine 350, and number of rules 352.

Data collector system 318 provides an interface to number of simulators 302. Data collector system 318 may allow other components within modular training system 316 to exchange information with number of simulators 302. For example, simulation software interface 328 provides an interface to simulation software such as, for example, simulation software 312. More specifically, simulation software interface 328 provides a capability to obtain simulation data 354 from simulation software 312. Simulation software interface 328 may contain processes such as, for example, application programming interfaces needed to communicate with simulation software 312.

Data format process 330 may translate this data into a format for use by assessment module 336. This data forms formatted simulation data 356. Formatted simulation data 356 may be recognizable and/or usable by any assessment module within number of assessment modules 334.

Assessment module interface 332 may send formatted simulation data 356 to an assessment module such as assessment module 336. In a similar fashion, commands received from assessment module 336 through assessment module interface 332 may be formatted by data format process 330 into a format that is recognizable and/or usable by simulation software 312. One example of these formatted commands is simulation specific command 366 and is sent to simulation software 312 through simulation software interface 328.

Data collector 326 provides a capability to use modular training system 316 with various types of simulators within number of simulators 302. Also, when a new simulator is encountered in number of simulators 302, a new data collector may be generated in number of data collectors 324 to allow the exchange of information with a new simulator. In this manner, alteration or changes to the other components within modular training system 316 such as, for example, number of assessment modules 334 and number of instructor modules 344 may not need to be made.

Assessment module 336 may use formatted simulation data 354 to generate event 358. An event is any indication that the simulation has reached a number of criteria. For example, an event is generated if a pilot has lowered the landing gear or an aircraft has fallen more than 1,000 feet below an enemy aircraft. Event 358 is generated by applying number of rules 342 with rule engine 340 in assessment module 336. Assessment process 338 may then send event 358 to instructor module 346. Instructor process 348 and instructor module 346 may process event 358 by applying number of rules 352 to event 358 using rule engine 350.

The application of number of rules 352 to event 358 generates reaction 360. Reaction 360 may take various forms. For example, without limitation, reaction 360 may be simulation command 362, notification 364, or some other suitable reaction.

Simulation command 362 may be sent to data collector 326. Simulation command 362 is in a format that may be usable by any data collector within number of data collectors 324. Data collector 326 may then process simulation command 362 using data format process 330 to generate simulation specific command 366. Simulation specific command 366 is a command in a format that is usable by a particular type of simulation software, such as simulation software 312. Simulation specific command 366 may then be sent to simulation software 312 through simulation software interface 328.

Notification 364 may be, for example, any and all messages, a text message, or some other type of suitable notification. If notification 364 is sent to simulation software 312, data format process 330 may format notification 364 into simulation specific command 366. In other advantageous embodiments, data format process 330 may format notification 364 into a form for transmission to a remote data processing system or other device.

Simulation specific command 366 may be used to alter simulation 314. Simulation specific command 366 may be, for example, without limitation, a command to lower a score, increase a score, change a parameter in simulation 314, or perform some other suitable alteration to simulation 314. The alteration of the parameter within simulation 314 may be, for example, the threat level of an aircraft or the weather in the simulation being modified based on student performance. In some simulations, the weather simulation may run on a separate, networked computer. In that case, although the events come from an aircraft simulation, the parameter to alter "the simulation" may be sent to the natural environment or weather simulator.

In these different advantageous embodiments, rule engine 340 and rule engine 350 may be implemented using currently available rule engines. Rule engine 340 and rule engine 350 may be implemented using different types of rule engines including, for example, a reactive rule engine and/or some other suitable engine. A production rule engine uses rules to represent behaviors of the type of condition then action. A reaction rule engine may detect incoming events and process event patterns.

With modular training system 316, various modules may be used without changing simulation software 312. In other words, all of the different modules within modular training system 316 are able to communicate with each other using a standardized format and/or protocol. Any standard and/or protocol may be used. If a new module is created, that new module uses the same format and/or protocol. This architecture allows for the addition and changing of modules with less effort, because modules can be swapped out for other modules that perform the same function. For example, an assessment module for assessing landing skills may be replaced with another assessment module for preflight skills.

By making changes to modular training system 316, different goals, objectives, and points may be made without necessarily requiring changes to simulation software 312. For example, the modules may be used to prevent an occurrence of bad training. As a specific example, when a student uses a situational display for close in maneuvering rather than a video display, modular training system 316 may generate a notification to an instructor identifying the problem. In other advantageous embodiments, a student's score may be reduced, cues may be sent to the student, or other suitable commands may be generated to alter simulation 314.

For example, number of rules 342 and number of rules 352 may be changed using other rules or rewritten. The rewriting of rules may be performed much more quickly than rewriting code for simulation software. By adding, changing, or otherwise modifying rules, increased flexibility is provided within modular training system 316.

As another illustrative example, modular training system 316 may be changed from a maintenance training system to a flight training system by changing number of rules 342 and number of rules 352. Further, if goals or procedures change, number of rules 342 and number of rules 352 may be changed, augmented, or otherwise modified to take into account these changes.

Modular training system 316 may be used with many different types of simulation software. Different simulation software other than simulation software 312 may be used with modular training system 316 by selecting an appropriate data collector within number of data collectors 324.

Further, the creation of a new data collector for new simulation software may be generated and used with the existing number of assessment modules 334 and number of instructor modules 344. Also, in different advantageous embodiments, multiple assessment modules and multiple instructor modules may be used rather than a single assessment module and a single instructor module.

The illustration of simulation environment 300 in FIG. 3 is not meant to imply architectural and/or physical limitations to the manner in which different advantageous embodiments may be implemented. For example, in some advantageous embodiments, only a single assessment module and a single instructor module may be present. In yet other advantageous embodiments, multiple assessment modules may be used with a single instructor module. In still other advantageous embodiments, the functions of data collector system 318 may be implemented within assessment system 320 and/or instructor system 322.

For example, assessment module 336 may include a simulation software interface to obtain data directly from a simulator. In yet other advantageous embodiments, additional components may be used in addition or in place of the ones illustrated. For example, the different advantageous embodiments may include an audio generation device to present reaction 360 outside of a simulation.

Figure 4:
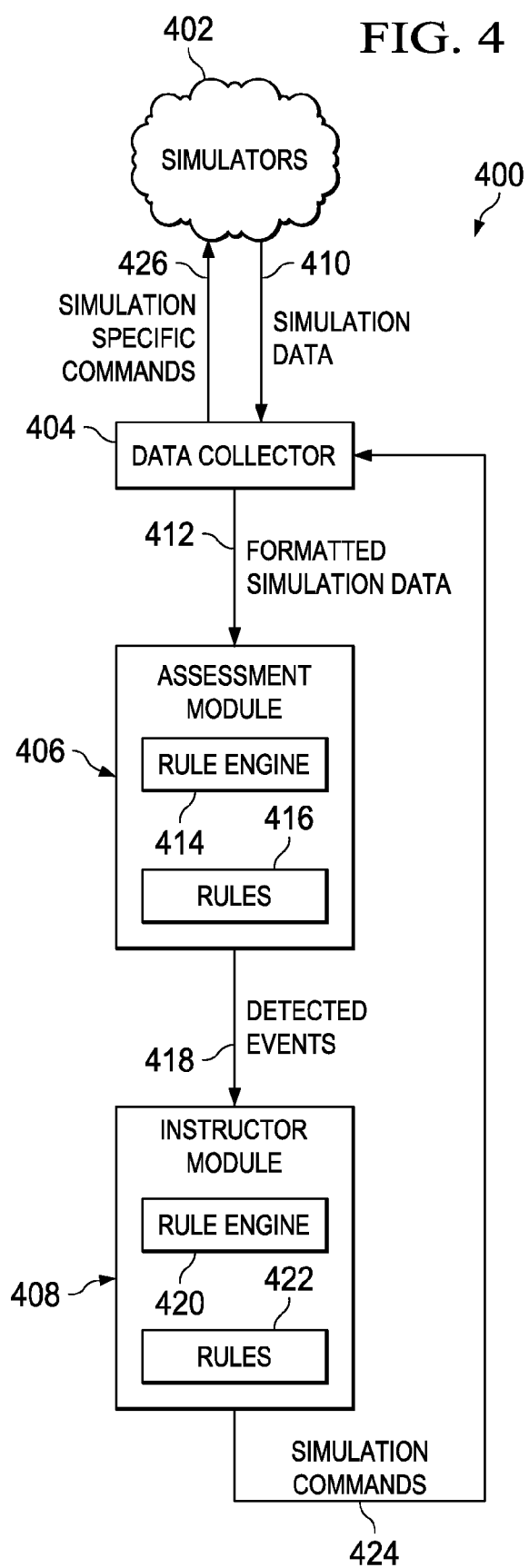
FIG. 4 is a diagram illustrating data flow in a simulation environment in accordance with an advantageous embodiment.

With reference now to FIG. 4, a diagram illustrating data flow in a simulation environment is depicted in accordance with an advantageous embodiment. Simulation environment 400 is an example of one implementation for simulation environment 300 in FIG. 3. In this example, simulation environment 400 includes simulators 402, data collector 404, assessment module 406, and instructor module 408.

As illustrated, data collector 404 may receive simulation data 410 from simulators 402. Data collector 404 may use interfaces such as, for example, application programming interfaces, with simulators 402 to obtain simulation data 410. Simulation data 410 is formatted to form formatted simulation data 412 by data collector 404. Formatted simulation data 412 is a form usable by assessment module 406.

Assessment module 406 invokes rule engine 414 to apply rules 416 to formatted simulation data 412. This process may generate one or more events. These events are sent to instructor module 408 as detected events 418. Instructor module 408 processes detected events 418 by invoking rule engine 420 to apply rules 422 to detected events 418. Application of rules 422 may generate reactions in the form of simulation commands 424. Simulation commands 424 are sent back to data collector 404 in these examples. Data collector 404 may then format simulation commands 424 into simulation specific commands 426 for use in simulators 402.

Instructor module 408 determines how to react to detected events 418 based on rules 422. These reactions may include, for example, without limitation, adjusting the student's score, altering the simulation, providing audio alerts to an individual, or some other suitable type of reaction.

Figure 5:
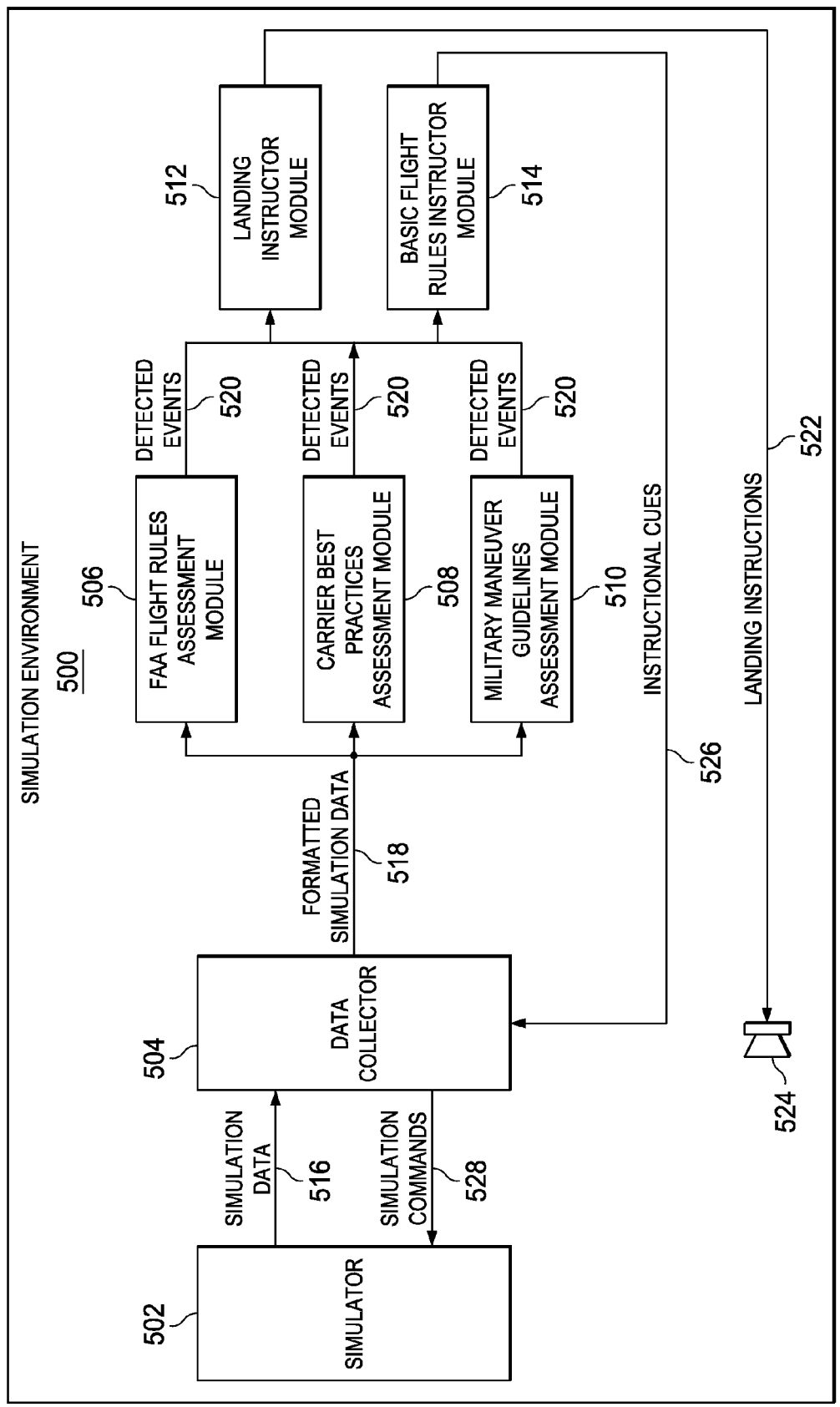
FIG. 5 is a diagram illustrating a simulation environment in accordance with an advantageous embodiment.

With reference now to FIG. 5, a diagram illustrating a simulation environment is depicted in accordance with an advantageous embodiment. Simulation environment 500 is an example of one implementation of simulation environment 300 in FIG. 3.

As can be seen from this example implementation, more than one assessment module and instructor module is present.

The different advantageous embodiments provide a capability to use multiple modules to increase the flexibility and reconfigurability of simulation environments.

In this example, simulation environment 500 includes simulator 502, data collector 504, FAA flight rules assessment module 506, carrier best practices assessment module 508, military maneuver guidelines assessment module 510, landing instructor module 512, and basic flight rules instructor module 514.

Data collector 504 obtains simulation data 516 from simulator 502. Simulation data 516 is formatted into formatted simulation data 518 by data collector 504. Data collector 504 then sends formatted simulation data 518 to FAA flight rules assessment module 506, carrier best practices assessment module 508, and military maneuver guidelines assessment module 510. These different modules may process formatted simulation data 518 and invoke the rule engine in the respective modules to apply the rules for the respective modules to the formatted simulation data.

In some advantageous embodiments, a module may selectively process data depending on the type of data. In other advantageous embodiments, all of the assessment modules may apply rules to all of formatted simulation data 518. With this type of implementation, no events may be generated depending on the particular data in formatted simulation data 518 and the particular rule being applied.

Detected events 520 are a number of events that may be generated from one of FAA flight rules assessment module 506, carrier best practices assessment module 508, and military maneuver guidelines assessment module 510. Detected events 520 are sent to landing instructor module 512 and basic flight rules instructor module 514. These different instructor modules apply rules to detected events 520 to generate various reactions.

For example, landing instructor module 512 may generate landing instructions 522 for each phase of the flight as identified in detected events 520. Landing instructions 522 may be sent to audio device 524 near simulator 502 for presentation to the student. Landing instructor module 512 generates simulation commands, such as instructional cues 526, as reactions to one or more of detected events 520. Instructional cues 526 are sent to data collector 504.

Data collector 504 formats instructional cues 526 into simulation commands 528, which are sent to simulator 502 for presentation to the student. Of course, in some advantageous embodiments, landing instructions 522 also may be sent to data collector 504 to be formatted into simulation commands 528 for presentation as an audio cue or instruction in simulator 502.

In this manner, the different advantageous embodiments allow multiple assessment modules to be used in the same simulation. This type of implementation of simulation environment 500 allows for different groups of rules to be separated and used during an assessment. Further, the different advantageous embodiments also allow an ability to provide different types of reactions using different types of instruction modules. As a result, a particular simulation may be tailored to a particular need based on a selection of assessment modules and/or instructor modules.

Figure 6:
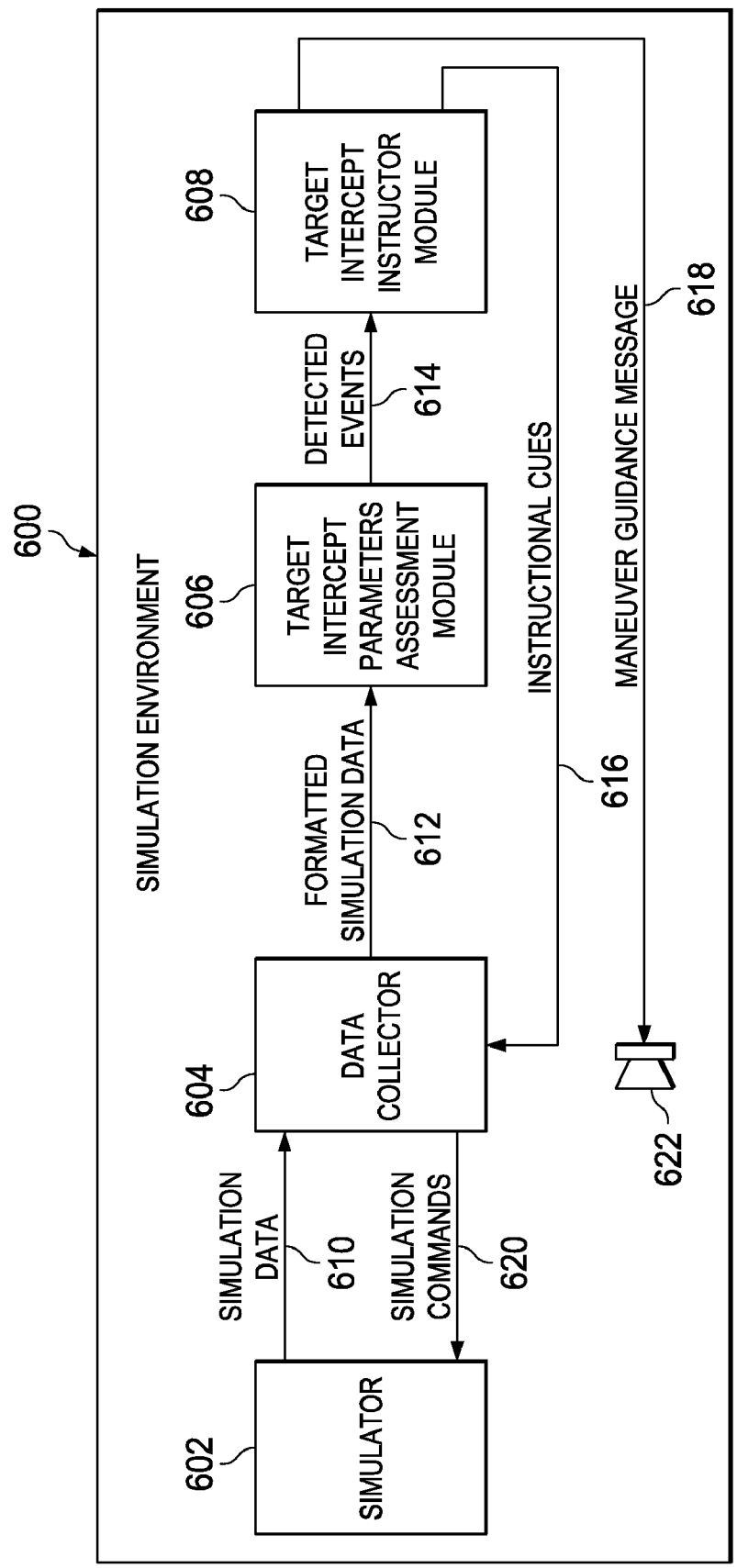
FIG. 6 is a diagram illustrating an implementation of a simulation environment in accordance with an advantageous embodiment.

With reference now to FIG. 6, a diagram illustrating an implementation of a simulation environment is depicted in accordance with an advantageous embodiment. In this example, simulation environment 600 is an example of a simulation environment that may be used for a military maneuver training exercise. Simulation environment 600 includes simulator 602, data collector 604, target intercept parameters assessment module 606, and target intercept instructor module 608.

Data collector 604 receives simulation data 610 from simulator 602. Data collector 604 formats simulation data 610 into formatted simulation data 612. Formatted simulation data 612 is sent to target intercept parameters assessment module 606.

Target intercept parameters assessment module 606 applies rules to formatted simulation data 612 to generate detected events 614. Target intercept parameters include, for example, student altitude and heading in relation to the enemy aircraft. Each of these measurements may generate an event if the student exceeds the tolerances defined by the rules. Detected events 614 are sent to target intercept instructor module 608.

Target intercept instructor module 608 may generate reactions in the form of instructional cues 616 and maneuver guidance message 618. Instructional cues 616 may be sent back to data collector 604 for formatting into simulation commands 620 and sent back to simulator 602. Maneuver guidance message 618 may be presented on audio device 622 to the student or other user.

Figure 7:
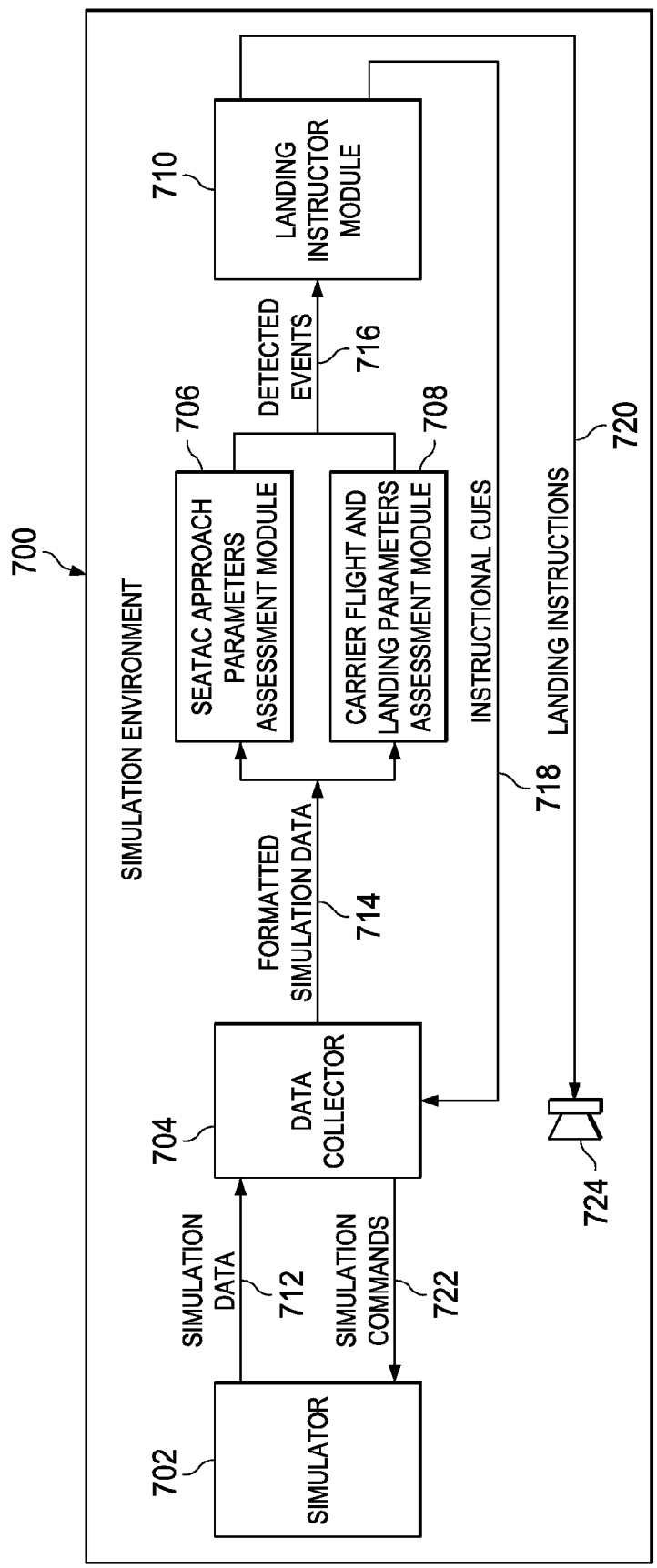
FIG. 7 is another example of an implementation of a simulation environment in accordance with an advantageous embodiment.

With reference now to FIG. 7, another example of an implementation of a simulation environment is depicted in accordance with an advantageous embodiment. In this example, simulation environment 700 is used for commercial aircraft landing training. Simulation environment 700 is another example of using multiple instruction modules. Simulation environment 700 includes simulator 702, data collector 704, SEATAC approach parameters assessment module 706, carrier flight and landing parameters assessment module 708, and landing instructor module 710.

In this example, simulator 702 generates simulation data 712, which is obtained by data collector 704. Data collector 704 generates formatted simulation data 714 using simulation data 712. Data collector 704 sends formatted simulation data 714 to SEATAC approach parameters assessment module 706 and carrier flight and landing parameters assessment module 708.

These different assessment modules process formatted simulation data 714 using rules and rule engines to generate detected events 716. Detected events 716 are sent to landing instructor module 710. Landing instructor module 710 processes detected events 716 using rules and a rule engine to generate reactions in the form of instructional cues 718 and landing instructions 720.

Instructional cues 718 are sent to data collector 704 and formatted to generate simulation commands 722. Landing instructions 720 are sent to audio device 724 for presentation to a student.

Figure 8:
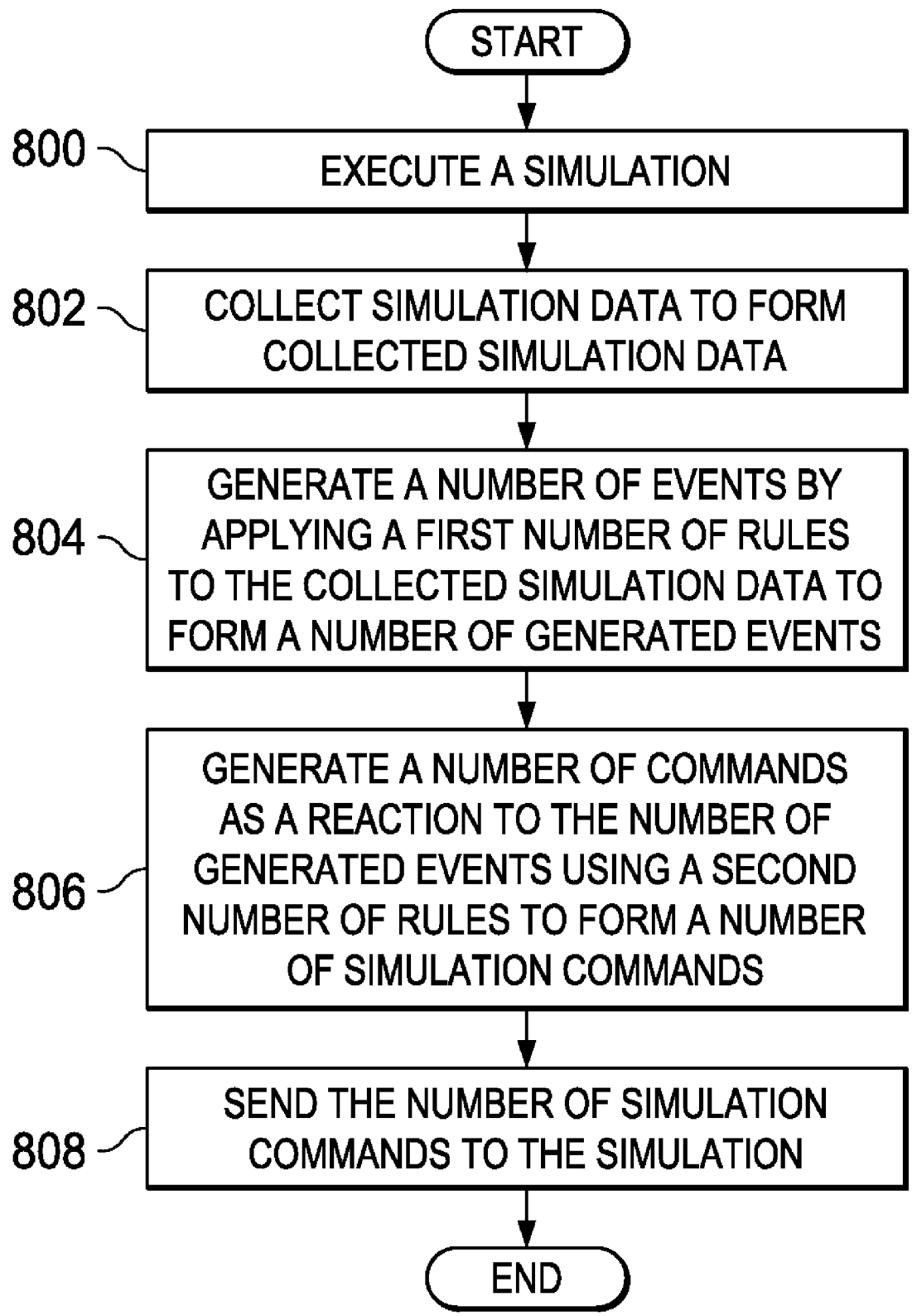
FIG. 8 is a flowchart of a process for performing a simulation in accordance with an advantageous embodiment.

With reference now to FIG. 8, a flowchart of a process for performing a simulation is depicted in accordance with an advantageous embodiment. The process illustrated in FIG. 8 may be implemented using a simulation environment such as, for example, simulation environment 300 in FIG. 3. The different operations in this process may be executed using one or more computers located within the simulation environment.

The process begins by executing a simulation (operation 800). In these examples, the simulation in operation 800 may be simulation 314 generated by executing simulation software 312 in simulator 304 in FIG. 3. The process then collects simulation data, while executing the simulation, to form collected simulation data (operation 802). A number of events are generated by applying a first number of rules to the collected simulation data to form a number of generated events (operation 804).

The process then generates a number of commands as a reaction to the number of generated events using a second number of rules to form a number of simulation commands (operation 806). The process then sends the number of simulation commands to the simulation (operation 808), with the process terminating thereafter.

Figure 9:
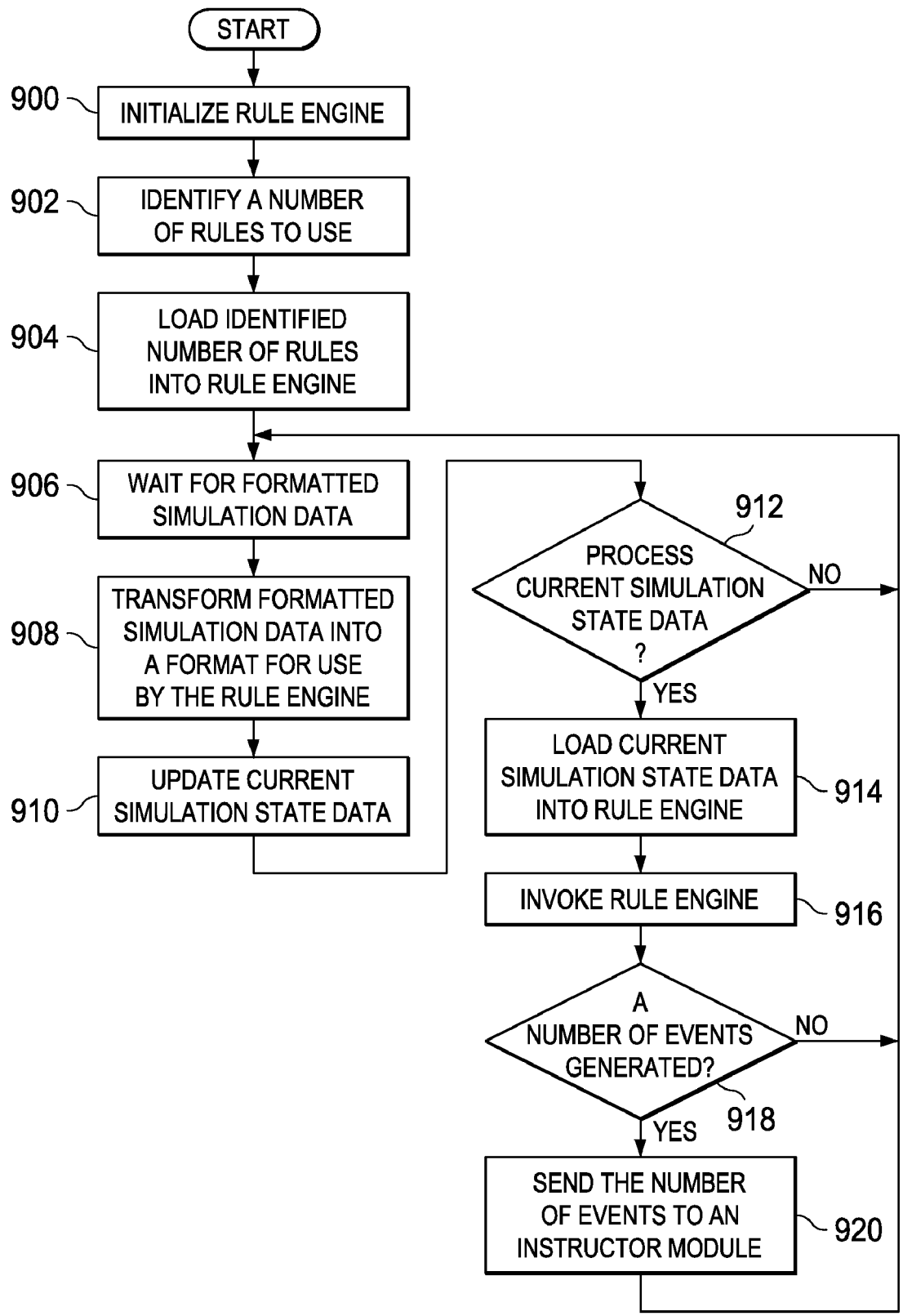
FIG. 9 is a flowchart of a process for an assessment module in accordance with an advantageous embodiment.

With reference now to FIG. 9, a flowchart of a process for an assessment module is depicted in accordance with an advantageous embodiment. The process illustrated in FIG. 9 may be implemented in an assessment module such as, for example, assessment module 336 in FIG. 3.

The process begins by initializing the rule engine for the module (operation 900). The process then identifies a number of rules to use (operation 902). The process loads the identified number of rules into the rule engine (operation 904). The process then waits to receive formatted simulation data (operation 906).

When the formatted simulation data is received, the process transforms the formatted simulation data into a format for use by the rule engine (operation 908). The process then updates the current simulation state data (operation 910). In operation 908, the process converts the data into any format that may be needed by the particular rule engine. In operation 910, the process updates the current simulation state data by placing the transformed formatted simulation data into a state object. State data includes data that is relevant to the simulation being monitored. This data may include, for example, altitude, speed, and/or throttle positions.

The process then determines whether the current simulation state data should be processed (operation 912). This determination may be made in a number of different ways. For example, the processing of current simulation state data may be performed periodically based on some selected period of time that may be selected during initialization of the module. If the current simulation state data should not be processed in operation 912, the process returns to operation 906 to wait to receive additional formatted simulation data.

If the current simulation state data is to be processed, the process loads the current simulation state data into the rule engine (operation 914). Operation 914 may involve passing a pointer to the state object from the rule engine. The process then invokes the rule engine (operation 916). Operation 916 causes the rule engine to apply the identified number of rules to the current simulation state data as stored in the state object.

Next, a determination is made as to whether a number of events has been generated by the rule engine (operation 918). If a number of events has been generated, the process sends the number of events to an instructor module (operation 920). The process then returns to operation 906 as described above. With reference again to operation 918, if a number of events has not been generated, the process returns directly to operation 906.

Figure 10:
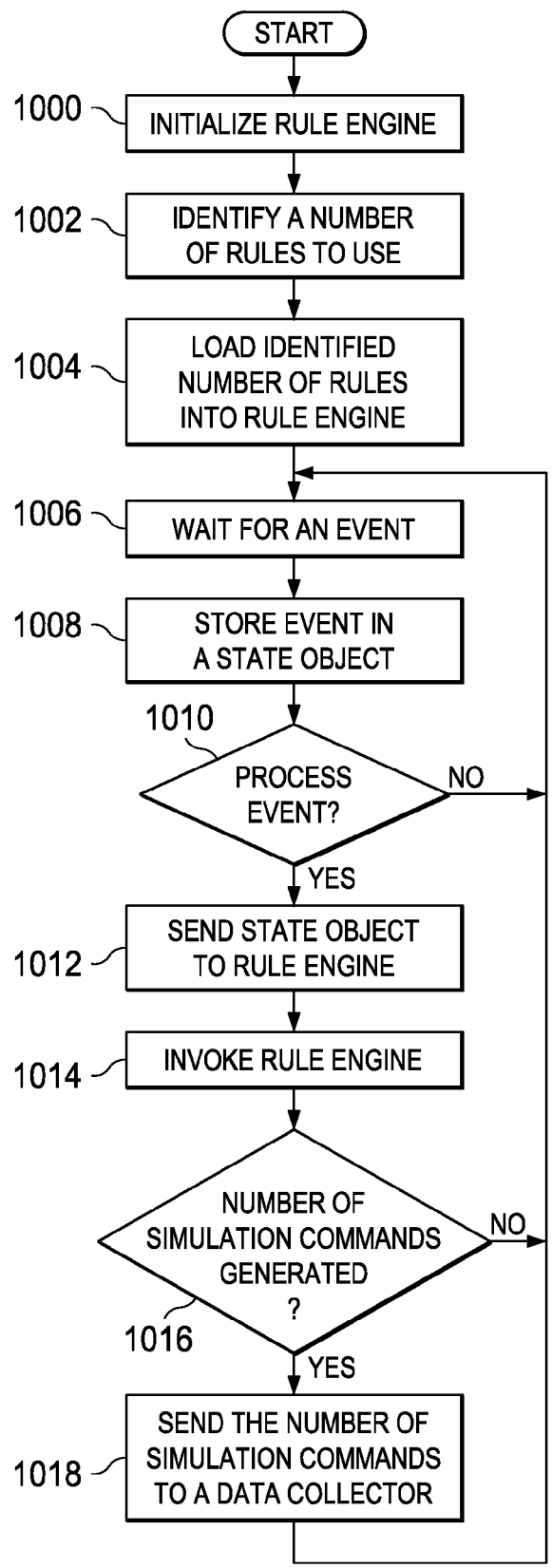
FIG. 10 is a flowchart of a process for an instructor module in accordance with an advantageous embodiment.

With reference now to FIG. 10, a flowchart of a process for an instructor module is depicted in accordance with an advantageous embodiment. The process illustrated in FIG. 10 may be implemented in an instructor module such as, for example, instructor module 346 in FIG. 3.

The process begins by initializing a rule engine (operation 1000). The process then identifies a number of rules to use with the rule engine (operation 1002). The process then loads the identified number of rules into the rule engine (operation 1004).

The process then waits to receive an event (operation 1006). Once an event is received, the process stores the event in a state object (operation 1008). A determination is made as to whether the event should be processed (operation 1010). If the event is not to be processed, the process returns to operation 1006 in a loop until the event should be processed.

If the event should be processed, the process sends the state object to a rule engine (operation 1012). The process then invokes the rule engine to apply the identified rules to the event in the state object (operation 1014). A determination is made as to whether a number of simulation commands have been generated (operation 1016). If a number of simulation commands has been generated, the process sends the number of simulation commands to a data collector (operation 1018), with the process then returning to operation 1006 as described above. If a number of simulation commands has not been generated, the process proceeds directly back to operation 1006.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and computer program product for performing the training activity. In the different advantageous embodiments, a simulation is executed, and simulation data is collected while executing the simulation. A number of events may be generated by applying a first number of rules to the collected simulation data. A number of commands may be generated as a reaction to the number of generated events using a second number of rules to form a number of simulation commands. This number of simulation commands may be sent to the simulation.

In this manner, the different advantageous embodiments allow a student to optimize learning in a manner as desired for a particular course. The different advantageous embodiments allow for the use of current simulation programs without the rewriting of code or modifications to those programs. Instead, the different advantageous embodiments may provide improved learning through the use of rules with a rule engine in different modules to assess and generate reactions. The reactions may provide feedback to the student.

Further, with the modularity of the different components, multiple assessment modules and/or instructor modules may be used to generate a particular training program. Further, modules may be tailored to a particular lesson or class. With the use of rules and rule engines, the different advantageous embodiments provide for increased flexibility to change the manner in which a simulation is performed in a more rapid manner than currently permitted.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments have been described with respect to simulations for aircraft, other advantageous embodiments may be applied to simulations for other types of objects.

For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a weapon system, a weapon, an environmental process, a testing device, a manufacturing facility, a building, and/or some other suitable object.

The different advantageous embodiments may be applied to simulations involving hardware. For example, without limitation, in an aircraft simulation, the different advantageous embodiments may use an actual aircraft in addition to and/or in place of software that simulates aircraft.

Hardware in the actual aircraft may provide the events and data in real time. Real time means that the data is sent as quickly as possible. An example of this implementation is an onboard assessment and/or remote tool that may provide the pilot with real time cues when certain events occur. Such events may include, for example, without limitation, altitude monitoring or landing approach guidance.

Further, different advantageous embodiments may provide different advantages as compared to other advantageous embodiments. For example, the different advantageous embodiments also may be applied for use with video games. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing a simulation, the method comprising:
    executing the simulation;
    collecting simulation data while executing the simulation to form collected simulation data;
    converting the collected simulation data into a formatted collected simulation data, wherein the formatted collected simulation data is in a standardized format for a flight rules assessment module, a best practices assessment module, and a maneuver guidelines assessment module;
    sending the formatted collected simulation data to at least one of the flight rules assessment module, the best practices assessment module, and the maneuver guidelines assessment module;
    generating, by at least one of the flight rules assessment module, the best practices assessment module, and the maneuver guidelines assessment module, a number of events by applying a first number of rules to the formatted collected simulation data to form a number of generated events;
    generating a number of commands as a reaction to the number of generated events by applying a second number of rules to the number of generated events to form a number of simulation commands, wherein the number of simulation commands include feedback to a student participating in the simulation; and
    sending the number of simulation commands to the simulation.

2. The method of claim 1, wherein the step of generating the number of events by applying the first number of rules to the collected simulation data to form the number of generated events comprises:
    sending the collected simulation data to a rule engine that uses the first number of rules; and
    invoking the rule engine to apply the first number of rules to the collected simulation data to form the number of generated events.

3. The method of claim 1, wherein the step of generating the number of commands as the reaction to the number of generated events by applying the second number of rules to the number of generated events to form the number of simulation commands comprises:

sending the number of generated events to a rule engine that uses the second number of rules; and invoking the rule engine to generate the number of commands as the reaction to the number of generated events by applying the second number of rules to the number of generated events to form the number of simulation commands.

4. The method of claim 1, wherein the number of simulation commands are selected from one of a verbal cue, a score change, a notification to a live instructor, and a parameter change for the simulation.

5. The method of claim 1, wherein the collecting step is performed using a data collector.

6. The method of claim 1, wherein the step of generating the number of events by applying the first number of rules to the collected simulation data to form the number of generated events is performed using an assessment module.

7. The method of claim 1 further comprising:

changing a number of rules in at least one of the first number of rules and the second number of rules prior to executing the simulation.

8. The method of claim 1, wherein the step of generating the number of commands as the reaction to the number of generated events by applying the second number of rules to the number of generated events to form the number of simulation commands is performed using an instructor module.

9. The method of claim 1, wherein the simulation is selected for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a software application, a medical device, a weapon system, a weapon, an environmental process, a testing device, and a manufacturing facility.

10. An apparatus comprising:

a data collector system capable of receiving simulation data from a number of simulations and capable of sending a number of commands to the number of simulations;

an assessment system capable of generating a number of events from the simulation data;

an instructor system capable of generating a reaction to the number of events; and a number of data processing systems, wherein the data collection system, the assessment system, and the instructor system are configured to execute on the number of data processing systems;

program instructions stored in one or more computer-readable storage devices for execution by one or more processors in the number of data processing systems for executing the simulation;

program instructions stored in one or more computer-readable storage devices for execution by one or more processors in the number of data processing systems for collecting simulation data while executing the simulation to form collected simulation data;

program instructions stored in one or more computer-readable storage devices for execution by one or more processors in the number of data processing systems for converting the collected simulation data into a formatted collected simulation data, wherein the formatted collected simulation data is in a standardized format for a flight rules assessment module, a best practices assessment module, and a maneuver guidelines assessment module;

program instructions stored in one or more computer-readable storage devices for execution by one or more processors in the number of data processing systems for sending the formatted collected simulation data to at least one of the flight rules assessment module, the best practices assessment module, and the maneuver guidelines assessment module;

program instructions stored in one or more computer-readable storage devices for execution by one or more processors in the number of data processing systems for generating, by at least one of the flight rules assessment module, the best practices assessment module, and the maneuver guidelines assessment module, a number of events by applying a first number of rules to the formatted collected simulation data to form a number of generated events;

program instructions stored in one or more computer-readable storage devices for execution by one or more processors in the number of data processing systems for generating a number of commands as a reaction to the number of generated events by applying a second number of rules to the number of generated events to form a number of simulation commands, wherein the number of simulation commands include feedback to a student participating in the simulation; and program instructions stored in one or more computer-readable storage devices for execution by one or more processors in the number of data processing systems for sending the number of simulation commands to the simulation.

11. The apparatus of claim 10 further comprising:

a number of simulators capable of executing simulation software for the number of simulations.

12. The apparatus of claim 10, wherein the reaction comprises at least one of a number of simulation commands and a number of notifications.

13. The apparatus of claim 10, wherein the assessment system comprises a number of assessment modules in which each assessment module in the number of assessment modules comprises a number of rules and a rule engine.

14. The apparatus of claim 10, wherein the instructor system comprises a number of instructor modules in which each instructor module in the number of instructor modules comprises a number of rules and a rule engine.

15. The apparatus of claim 10, wherein each simulation in the number of simulations is selected for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a software application, a medical device, a weapon system, a weapon, an environmental process, a testing device, and a manufacturing facility.

16. A computer program product for performing a simulation, the computer program product comprising:

a computer recordable storage medium;

program code, stored on the computer recordable storage medium, for executing the simulation;

program code, stored on the computer recordable storage medium, for collecting simulation data while executing the simulation to form collected simulation data;

program code, stored on the computer-recordable storage medium, for converting the collected simulation data into a formatted collected simulation data, wherein the formatted collected simulation data is in a standardized format for a flight rules assessment module, a best practices assessment module, and a maneuver guidelines assessment module;

program code, stored on the computer-recordable storage medium, for sending the formatted collected simulation data to at least one of the flight rules assessment module, the best practices assessment module, and the maneuver guidelines assessment module;

program code, stored on the computer recordable storage medium, for generating, by at least one of the flight rules assessment module, the best practices assessment module, and the maneuver guidelines assessment module, a number of events by applying a first number of rules to the formatted collected simulation data to form a number of generated events;

program code, stored on the computer recordable storage medium, for generating a number of commands as a reaction to the number of generated events by applying a second number of rules to the number of generated events to form a number of simulation commands, wherein the number of simulation commands include feedback to a student participating in the simulation; and program code, stored on the computer recordable storage medium, for sending the number of simulation commands to the simulation.

17. The computer program product of claim 16, wherein the program code, stored on the computer recordable storage medium, for generating the number of events by applying the first number of rules to the collected simulation data to form the number of generated events comprises:

program code, stored on the computer recordable storage medium, for sending the collected simulation data to a rule engine that uses the first number of rules; and program code, stored on the computer recordable storage medium, for invoking the rule engine to apply the first number of rules to the collected simulation data to form the number of generated events.

18. The computer program product of claim 16, wherein the program code, stored on the computer recordable storage medium, for generating the number of commands as the reaction to the number of generated events by applying the second number of rules to the number of generated events to form the number of simulation commands comprises:

program code, stored on the computer recordable storage medium, for sending the number of generated events to a rule engine that uses the second number of rules; and program code, stored on the computer recordable storage medium, for invoking the rule engine to generate the number of commands as the reaction to the number of generated events by applying the second number of rules to the number of generated events to form a number of simulation commands.

19. The computer program product of claim 16, wherein the number of simulation commands are selected from one of a verbal cue, a score change, a notification to a live instructor, and a parameter change for the simulation.

20. The computer program product of claim 16, wherein the simulation is selected for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a weapon system, a weapon, an environmental process, a testing device, and a manufacturing facility.

21. The computer program product of claim 16 further comprising:

program code, stored on the computer recordable storage medium, for changing a number of rules in at least one of the first number of rules and the second number of rules prior to executing the simulation.

* * * * *